J. C. LAQUEY.
THRASHING MACHINE.
No. 273,551.  Patented Mar. 6, 1883.
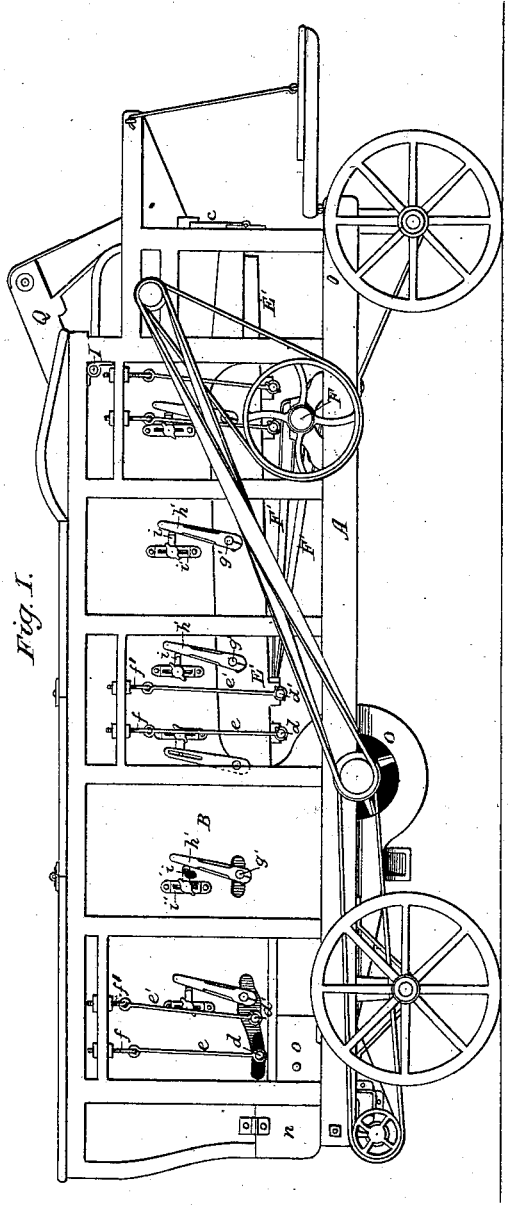
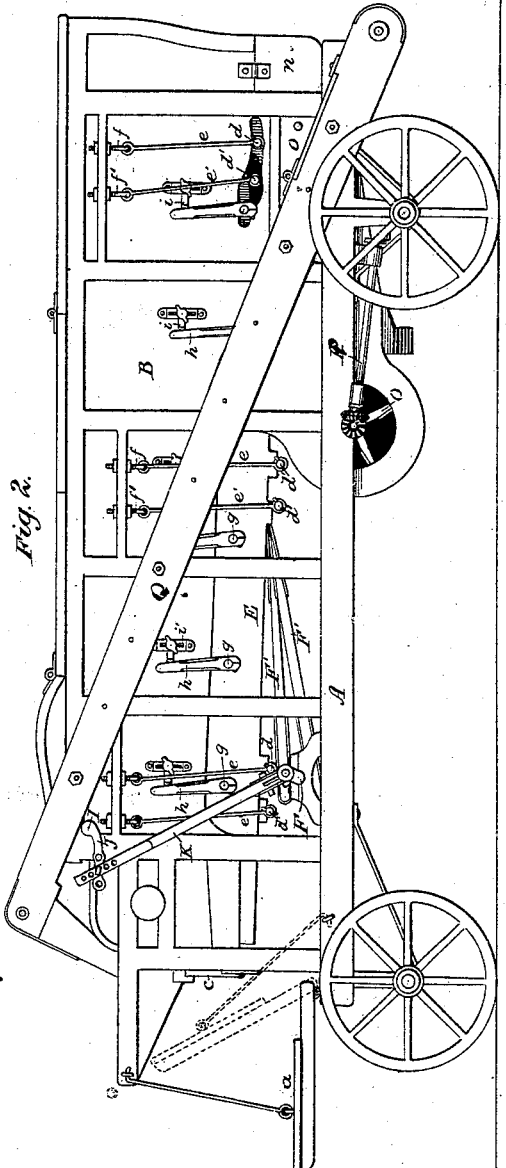
Witnesses:
C. Clarence Poole
Warren Suly
Inventor:
John C. Laquey
by Geo. W. Dyer
Attys

J. C. LAQUEY.
THRASHING MACHINE.

No. 273,551. Patented Mar. 6, 1883.

3 Sheets—Sheet 2.

Witnesses:
Clarence Poole
Warren Auly

Inventor:
John C. Laquey
by Geo. W. Dyer
Atty

J. C. LAQUEY.
THRASHING MACHINE.
No. 273,551.  Patented Mar. 6, 1883.
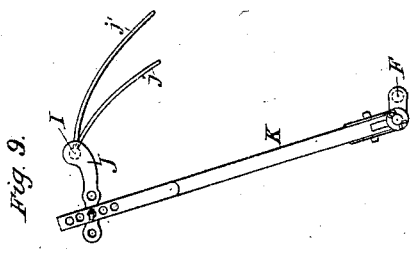
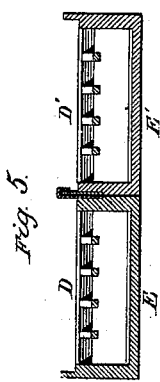
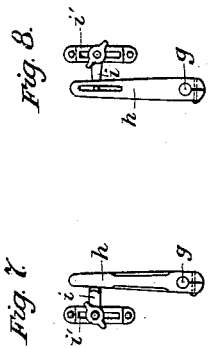
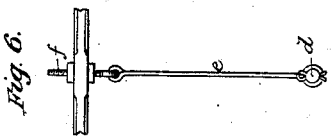
Witnesses:
C. Clarence Poole
Warren Sully
Inventor:
John C. Laquey
by Geo. W. Dyer & Co.
Attys

UNITED STATES PATENT OFFICE.

JOHN C. LAQUEY, OF BATTLE CREEK, MICHIGAN.

THRASHING-MACHINE.

SPECIFICATION forming part of Letters Patent No. 273,551, dated March 6, 1883.

Application filed August 19, 1878. Renewed October 14, 1880.

*To all whom it may concern:*

Be it known that I, JOHN C. LAQUEY, of Battle Creek, in the county of Calhoun and State of Michigan, have invented a new and useful Improvement in Thrashing-Machines; and I do hereby declare that the following is a full and exact description of the same, reference being had to the accompanying drawings, and to the letters of reference marked thereon.

Figure 3:
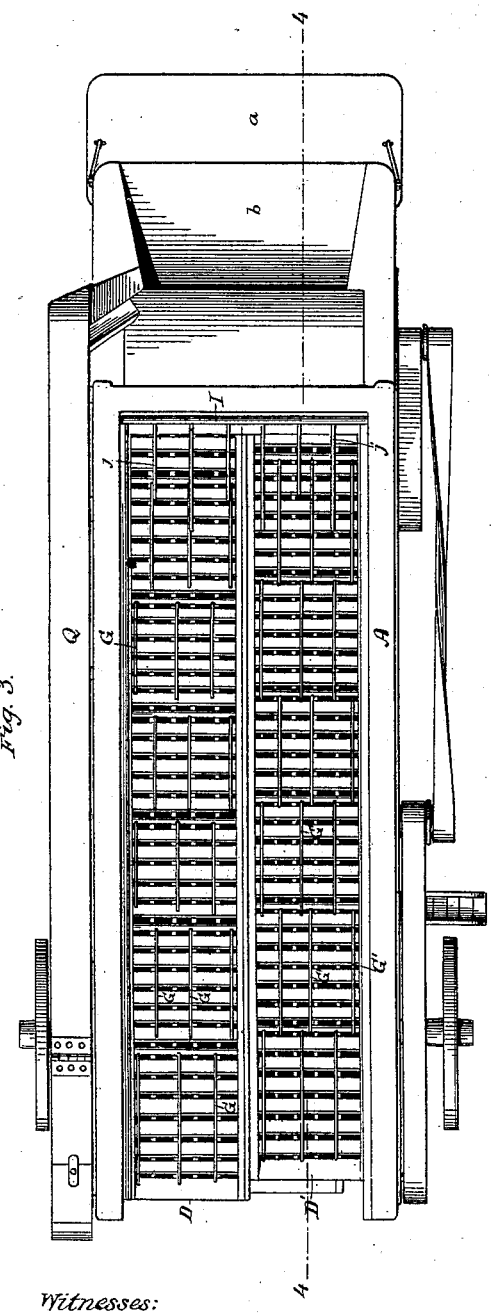
Figure 4:
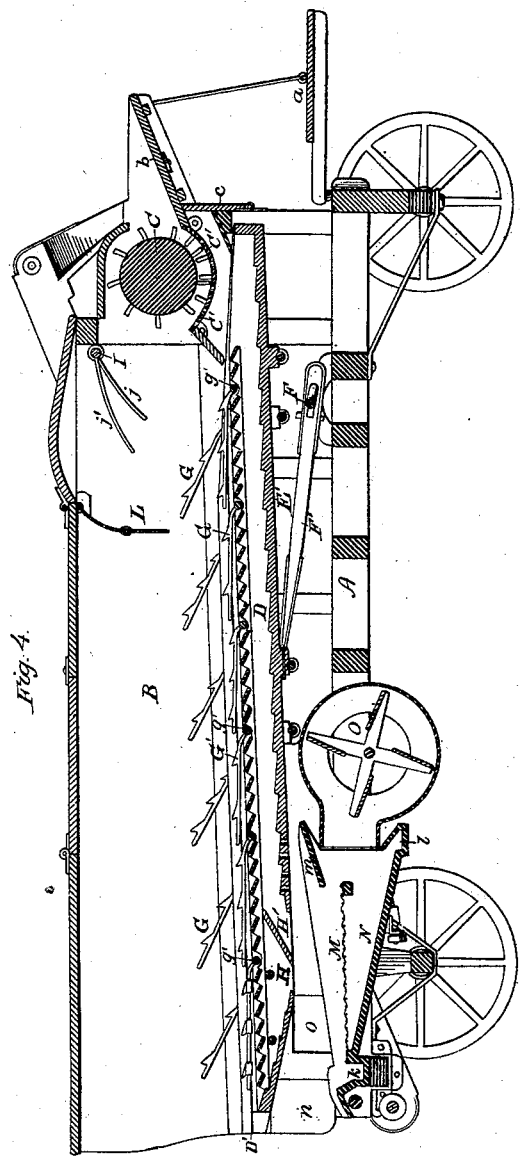

In the drawings, Figures 1 and 2 are side elevations of the machine; Fig. 3, a top view, with the upper part of the casing removed; Fig. 4, a vertical section of the machine on the line 4 4 in Fig. 3; Fig. 5, a cross-section of the vibrating shaker-carriers and grain-conveyers removed from the machine; Fig. 6, a separate view of one of the swing-rods or hangers to the shaker-conveyers and the means for adjusting the same; Fig. 7, a view of one of the arms which cause the fingers to rise and fall and its adjustable fulcrum; Fig. 8, a modified form of the same; and Fig. 9, a view of the adjustable connection of the deflector shaft, with its operating fingers or arms.

Like letters denote corresponding parts in all of the figures.

A is the frame-work of the machine, and B is the casing supported by it. The frame is mounted on wheels in the usual manner, and has a foot-board, $a$, hung on its front end, which, when the machine is not in use, can be swung up out of the way, as shown by dotted lines in Fig. 2.

The toothed thrashing-cylinder C is journaled in the frame at the head of the machine, and below it is the perforated toothed concave C'. The inclined feeding-bottom $b$ is removably held between the extended ends of the casing and frame, and below this bottom the end of the casing below the concave is closed by a swinging door, O.

The reciprocating shaker-carriers and conveyers D D' E E' are supported within the casing, with their forward ends under the concave, the material from the thrashing cylinder and upper surface of the concave passing directly onto the upper parts D D', of the shaker-carriers. A stationary inclined board, C'', may be placed at this point, to prevent any straw from crowding forward under the concave. The grain which falls through the openings of the concave is received by the stepped bottom or grain-conveyer E E', directly underneath the straw-shaker. To prevent any escape of grain that might otherwise fall forward of the front ends of the conveyers underneath the concave, another stationary inclined board may be placed at this point, as shown in Fig. 4. These reciprocating shaker-carriers and conveyers are two long boxes or troughs of equal height, width, and length, arranged side by side, and extending from the front, under the concave, to the tail of the machine, each box or trough being provided with longitudinal stepped pieces and cross-slats secured at an inclination on such steps tending rearward to form a separation and the better to assist the fingers in conveying and eliminating the straw and conveying and discharging the grain, the grain falling through vertical spaces between the slats onto the stepped bottom or conveyer parts as it is separated from the straw above, aided by the deflector-arms J J' and the two series of rising and falling fingers that project from the rock-shafts $g$ $g'$, and is conveyed to the discharge-perforations, provided therefor in the conveyer or opening H, aided by the stepped pieces, where it is delivered upon the screen M. The shakers and grain-conveyers are supported on any suitable number of cross-rods, $d$ $d'$, which extend transversely across the entire width of the machine, under them or through their sides, the rods $d$ being secured to the part E, or one bottom, while the rods $d'$ are attached to the other bottom or part, E'. Six of these rods, the preferred number, are shown, two supporting each end of the shaker-carriers and two the middle portions of the same. The ends of the rods $d$ $d'$ are swung on hangers $e$ $e'$, passing upwardly on the outside of the casing, and connected by eyes with the lower ends of screw-bolts $f$ $f'$, which are adjustably secured to horizontal pieces of the frame by nuts turned on the bolts on each side of such pieces, Fig. 6. By thus hanging the shakers, when they work loose in the ways on the inside of the casing they can be adjusted vertically to compensate for the wear and secure the best movement with the least possible friction. The shakers and conveyers extend laterally the entire width of the machine, and they have upwardly-projecting outer edges, which slide behind grooves covered by strips attached to the casing. At the inner edges of the shakers, where they meet, one is provided with an upwardly-projecting plate and the other with a bent plate, which extends over and behind the first plate, inclosing the same and covering the joint, so that no obstruction can lodge therein. The grain-conveyers are reciprocated by a crank-shaft, F, which is journaled in proper bearings transversely upon the lower part of the frame-work, near the head of the machine. This shaft is revolved by belt-connection with the shaft of the thrashing-cylinder, the other end of which is suitably connected with the power. The shaft F has two oppositely-projecting cranks, from which two connecting-rods, F', extend to the under side of the conveyer parts E E', to which they are pivoted, the two shakers and conveyers by these means being reciprocated alternately in opposite directions.

G G' are fingers which project toward the tail of the machine from rock-shafts $g\ g'$, journaled transversely in the top parts, D D', of the shakers, thus forming two series of rising and falling fingers. These shafts are placed at regular intervals in the place of cross-slats, and are of such a number that the fingers of one shaft, when in a horizontal position, extend to the next shaft, or nearly so. These fingers have barbs or teeth projecting from their upper edges, which tend toward the tail of the machine, as shown. The shafts $g\ g'$ project through the sides of the shakers below the casing at the forward end and center of the machine; but at the tail of the machine, where the casing is extended down to inclose the blast, the projecting ends of the shafts work in proper slots cast in the casing. To the ends of the shafts $g\ g'$ are keyed arms $h\ h'$, which project upwardly on the outside of the casing, and bear near their upper ends against adjustable fulcrums $i$. These fulcrums are plates which project horizontally from vertically-slotted plates $i'$, attached to the casing, the fulcrum-plates being vertically adjustable upon plates $i'$ by means of nuts to regulate the vertical movement of the barbed fingers, in order to adapt the machine to the varying conditions of straw and grain. The fulcrum-plates $i$ can either be constructed with rounded ends which bear directly against the rear sides of the arms, without being connected thereto, Fig. 7, or their outwardly-turned ends may work in slots in the arms, as shown in Fig. 8. The last construction is necessary when there is not room enough to place the fulcrum-plate behind any one of the arms. The shafts $g\ g'$ reciprocate respectively with the shaker to which they are secured, and the upper ends of the arms $h\ h'$ being prevented from moving with the shafts, it will be seen that the fingers will rise as they move toward the tail of the machine and fall as they return toward the front. The two series of fingers G G', being attached to the alternately-moving shakers, will move forward and back and rise and fall alternately. The shaker-carriers and conveyers are extended beyond the fingers at the head of the machine and under the concave to receive the grain therefrom.

The grain-conveyer parts E E' have closed sides and steps on the upper surfaces of their bottoms tending toward their outlets. A discharge-opening, H, is made in each bottom, about over the separating-screen M, the bottom to the rear of that opening being inclined up toward the end of the shaker-carrier part D, and having steps pointing toward the opening. In each opening H is placed a stationary inclined board, H', to exclude the direct blast from the grain-conveyer, while its bottom is perforated for a short distance in front, through which the most of the grain falls upon the screen below, while the lighter and coarser material passes out through the opening H.

J is the oscillating deflector-shaft, journaled transversely in the casing at the head, and near the top of the machine, just to the rear of the thrashing-cylinder. This shaft has deflector arms or fingers $j\ j'$, projecting inwardly therefrom, the arms $j'$ having more curve than the arms $j$, and projecting above them. Outside of the casing a curved arm, J, is keyed to one end of the deflector-shaft, having a series of holes. A pitman, K, projecting from a crank on the end of the crank-shaft F, has a doubled strap on its upper end, through which the arm J passes, provided with a number of holes, and pivoted to the arm J by a suitably-removable bolt or pin. By these means an oscillating movement is given to the deflector-shaft, and the deflector-arms are thrown up and down. The extent of the movement of the deflector-arms can be regulated at will by changing the pivotal point of the arm and pitman J K, and the parts thereby readily adjusted, so that the arms will make a short stroke close to the cylinder, or high above the straw-shakers, or will have a long up-and-down movement, so as to adapt it to different conditions of straw and grain, its use being to arrest, deflect, and spread out the straw as it issues from the thrashing-cylinder.

Hanging from the top of the casing, a short distance from the deflector, and to its rear, is a pivoted curtain, L, made in two parts hinged together, to arrest any straw or grain that may pass by the deflector and direct it downward upon the rising and falling fingers.

At the tail of the machine, below the discharge-opening H of the stepped bottom, is situated the oscillating shoe, supported within the casing on hangers. Within the solid sides of this shoe is mounted, near the top, the screen M, at the tail end of which screen an inclined spout, $k$, leads into the lower end of the elevator. Below the screen M is a solid bottom, N, inclined toward the head of the machine, from the lower end of which a spout, $l$, projects outwardly, in front of the hind wheel, on the side of the machine opposite to the elevator. The separated and cleaned grain is discharged from this spout. Both the spouts $k$ and $l$ reciprocate with the shoe, the end of the spout $k$ working back and forth in an inclosing-case secured to the inner side of the elevator. The blower O is mounted in a case in front of the shoe, and an inclined board, $m$, supported by the shoe, directs the blast down upon the screen M. The blower is run by belt-connection with the thrashing-cylinder shaft. At the other end the transverse blower-shaft has a beveled gear meshing with a similar gear on the shaft P, at right angles thereto, which, by a crank and pitman pivoted to the bottom N, gives the shoe a transverse oscillating or reciprocating movement.

The elevator Q is mounted on one side of the machine, and carries the unthrashed heads of grain, which pass over the tail of the screen M back again to the thrashing-cylinder. The endless belt of the elevator is run by a shaft, Q', extending across the rear end of the machine and connected by a belt with the blower-shaft.

The casing at the tail of the shoe, and on a level with the top of the same, has on each side a swinging gate, $n$, and in front of each swinging gate a sliding door, $o$, which are used for the purpose of cleaning and regulating the sieves.

The grain is fed into the machine as the bands are cut on the board $b$ by the tender, who stands on the foot-board $a$, and it is thrashed between the cylinder and concave and then thrown rearward against the deflector-arms, the grain which passes through the openings of the concave falling directly on the stepped bottom of the grain-conveyer, by which it is conveyed to and through its discharge-perforations and delivered to the fanning-mill. As the straw and intermingled grain is thrown from the cylinder it is caught by the deflector-arms and directed downward, at the same time agitated and spread out very evenly upon the barbed and rising and falling fingers. By these it is then taken up, the barbs tearing apart the bunches and spreading the straw out in a thin and uniform stream, when it is successively tossed from finger to finger until every kernel of grain is sifted out of it. The straw, now cleaned of all grain, passes rapidly over the tail of the shaker-carriers in one continuous thin and uniform current, while the grain, heavier material, and partly-thrashed heads pass through the vertical spaces between the slats and fall onto the stepped bottom, and are conveyed to the discharge-openings by means of the vibratory movements of the shaker-conveyers, assisted by their peculiarly-constructed stepped bottoms, in manner precisely similar to the carrying of the straw by means of the barbs on the rising and falling fingers, before described. The hulls, chaff, and light particles being carried over the tail of the shoe by the blast, the cleaned grain passes through the screen onto the solid bottom and out of the spout $l$, while the partly-thrashed heads enter the spout $k$ and are carried back by the elevator to the head of the machine to re-enter the cylinder and be thrashed over again.

The advantages of my machine are numerous, some of which I will here enumerate. The adjustable reciprocating deflector, by being placed close to the thrashing-cylinder, will at once arrest and spread the swiftly-flying stream of straw and intermingled grain and deflect it downward upon the first set of the series of rising and falling fingers, thus immediately separating the greater portion of the grain from the straw, while it also serves to give the straw an even flow along the fingers; and, furthermore, in having two vibrating shaker-carriers and conveyers instead of one, or more than two, and reciprocating one-half their combined weight (whether loaded or not) in opposite directions by easily-adjustable swing rods or hangers, a perfect balance of the forward and backward movement is maintained, whether both straw-carrier and grain-conveyer are doing heavy or light work, and whether the shaker-carriers or grain-conveyers are heavily loaded or partially or entirely empty, as is evident, whereby the racking and shaking of the whole machine is prevented, and the necessity for staking done away with, at the same time that the whole machine is rendered easier to manage, in that there will be less clogging, less power is required to run the machine, and it will last much longer. There are other advantages, apparent to those skilled in the art, arising from the peculiar construction and arrangements of the minor parts of my machine.

The two shaker-carriers and conveyers could be used in a machine with their slatted tops removed, either using the fingers, as shown, or they might be connected with rock-shafts working in the stepped bottom, or other nonessential changes could be made in the arrangement; but I prefer the manner herein shown and described.

Having thus fully described my new thrashing-machine, what I claim, and desire to secure by Letters Patent of the United States, is—

1. The combination, with a straw-carrying floor composed of the alternately-reciprocating sections of finger-shafts mounted therein, arms projecting from the said finger-shafts, and straps or cords or other flexible or sliding connections connecting said arms to a rigid fastening.

2. The combination, with straw-shakers and grain-conveyers made respectively in two sections arranged side by side, of swinging rods or hangers for supporting the same, and means, substantially as described, for reciprocating said sections simultaneously in opposite directions, substantially as set forth.

3. In a thrashing-machine, the two combined alternately-reciprocating straw-shakers and grain-conveyers arranged side by side, in combination with the vibrating lifting-fingers carried by the said shakers, substantially as shown and described.

4. In a thrashing-machine, the combination, with a shaker, of the rising and falling fingers having barbs or teeth to assist in carrying the straw and separating the grain, and to prevent a retrograde movement of the straw, substantially as and for the purposes shown and described.

5. The combination, with the reciprocating sections or pans of the straw-shaker, of the cover for the space between the adjacent sides of said shakers, whereby grain and straw are prevented from entering between the said pans.

6. In a thrashing-machine, the combination, with the thrashing-cylinder, the shakers, and the lifting-fingers, of the oscillating deflector to arrest the straw at the outlet of the thrashing-cylinder, and to deflect it downward and spread it out upon the rising and falling fingers, substantially as shown and described.

7. In a thrashing-machine, the combination of the thrashing-cylinder and concave, the oscillating deflector-arms, and the vertically and longitudinally divided reciprocating shaker, the vibrating fingers, and the stepped bottom, substantially as shown and described.

8. The longitudinally-divided reciprocating top or straw-shaker parts, D D, in combination with the divided bottom or grain-conveyer part E E', substantially as described and shown.

This specification signed and witnessed this 19th day of July, 1878.

JOHN C. LAQUEY.

Witnesses:
V. D. BROCK,
MOSES B. RUSSELL.